Patented Jan. 2, 1951

2,536,171

UNITED STATES PATENT OFFICE 2,536,171

PRODUCTION OF PROTEIN HYDROLYSATE

Lloyd A. Hall and Louis Sair, Chicago, Ill., assignors to The Griffith Laboratories, Inc., Chicago, Ill., a corporation of Illinois No Drawing. Application January 21, 1947,
Serial No. 723,461

19 Claims. (Cl. 195—29)

The present invention relates to the production of protein hydrolysate of water-soluble character for oral administration as a food or medicine.

The administration of soluble protein and protein derivatives, such as hydrolysates and amino acids, as a medicinal type of food, has been growing in cases such as post-surgical treatments; gastro-intestinal troubles; food allergies; deficiency diseases; impaired nutrition; infection; pregnancy; burns; wounds and other conditions. While amino acids per se have heretofore been known and administered for such purposes, it is now a practice to include along with amino acids other soluble hydrolytic products of protein which are not degraded to the ultimate amino acid, but which are in soluble form as one or more of peptones, peptides, polypeptides and the like. These incomplete hydrolytic products function to save the body the work of building up to them from amino acids as must be done in those cases where the product administered is entirely amino acid. Clinical tests have indicated that about 45% to 50% of the total nitrogen of the original protein should be present as amino-nitrogen, and that the balance should be in solubilized aminoacid compounds higher than amino acids, such as peptones, peptides and polypeptides.

Hydrolysate products may be obtained by acid or mild alkaline hydrolyses carried out under controlled conditions, but these processes are more expensive, and involve loss of some amino acids; and frequently an excessive amount of salt or other inorganic chemical product is present with the hydrolysate material. Accordingly, hydrolysis by enzymes has been resorted to.

Enzymatic hydrolysis of protein is not commercially feasible for effecting complete hydrolysis to amino acids, since periods of from 2 to 4 weeks are required. Extension of time and other conditions improves the extent of hydrolysis by enzymes, but such longer time favors putrefaction, making the product malodorous and unpalatable, or wholly unfit for the intended purposes.

The present invention provides a method for producing protein hydrolysate, which is incidentally rich in vitamins, by enzymatic action with an adequate degree of conversion to aminoacid content and with a minimum of putrefaction.

It is a particular object of the invention to hydrolyse protein by mixed enzymes under conditions whereby the final product is substantially free from putrefaction.

It is a particular object of the invention to hydrolyse mixed proteins by mixed enzymes.

It is a particular object to use mixed enzymes comprising a protease and the peptidases of yeast.

It is a particular object of the invention to use active yeast S. cerevisiae as a source of protein, as a source of proteolytic enzyme, and incidentally as a source of vitamins.

It is another object of the invention to add yeast S. cerevisiae to a substrate consisting of protein, or its hydrolytic products, or both, in an aqueous mass containing a protease, under conditions to plasmolyse the yeast to release the proteolytic enzymes of the yeast cells for action on said substrate supplemented by the protein of the yeast.

It is a particular object of the invention to release active peptidases from yeast cells as an agent to supplement the hydrolytic action of one or more of proteases on a mixture of yeast protein and proteinaceous material the same as or foreign to yeast.

Various other and ancillary objects of the invention will become apparent from the following description and explanation.

Heretofore, it has been known to plasmolyse and autolyse yeast, thereby releasing and using the peptidases and other proteolytic enzymes thereof for action on the proteins of the yeast employed. Such autolysed yeast has been added to other hydrolytic products of protein in order to include in the preparation those products which are particularly produced by the action of the peptidases of the yeast.

According to the present invention the proteolytic enzymes of the yeast are not limited to action on the protein of the yeast, nor is the protein of the yeast limited to hydrolysis by the enzymes of the yeast. The present invention employs at least one or more kinds of protein materials, one of which is protein of yeast, any other being protein foreign to yeast. Also the enzyme content for the enzymolysis is a mixture of proteolytic enzymes including particularly for the desired effect, the peptidases present in the yeast. Thus, all the substance of all the protein is acted upon by the mixed enzymes, and the peptidases function in this general action to cleave intermediate products, in particular the peptides, into amino acids, thus to increase the content of amino acid by the more powerful peptidases available in yeast. In short, we use proteases to convert all the protein into solubilized hydrolysate products for the action thereon of peptidases of yeast, to form amino acids.

We have discovered that the peptidases of yeast, as released in our process in accordance with this invention, are highly active in substrates at high solids concentration and at the elevated temperature of our process, whereas peptidases of animal origin, such as found in erepsin, do not function effectively under such conditions. Accordingly, at such temperatures we may conduct the hydrolysis at high concentrations, but they may equally as well take place at lower concentrations. One advantage of high concentration is in economy, in eliminating the amount of water to be removed when the final substrate solution is to be dehydrated to secure the dry solids content thereof. However, this advantage is greatest when the concentration is not so high as to induce crystallization of hydrolysate products during the hydrolysis. When the latter does occur as a result of such high concentration, then a fractionation of the products is permitted by separating crystals and liquor. These may be recombined as solids, if desired. Practically, however, for recovery of all the hydrolysate, avoidance of crystallization is desired. The nature and amounts of water, of the proteins, of the protease, and of the yeast, and also the time of hydrolysis are important factors to determine whether or not there will be such crystallization. Cut and try methods are the best rule for standardizing the procedure to secure or to avoid such crystallization.

Where no crystallization occurs, the final hydrolysate may be filtered to clarify the solution prior to recovery of solids content. Where crystallization is to occur, it has been found possible to so clarify the liquid product prior to the end of hydrolysis. The proteases solubilize the protein to a filterable state, and the peptidases then act to produce amino acids, some of which crystallize. Therefore, clarification may be practiced at any convenient stage before any crystallization.

Although high concentration of solids in the resulting liquids is desirable from the economics of recovering solid content, it is also a factor in minimizing putrefaction. Our best results obtain at concentrations of at least 20% solids. From this point upward there is a narrow range up to about 25% solids content in the case of 1 part of yeast and 3 parts of casein, where crystallization does not occur. In general, for other proteins and ratios, a solids content of at least 20% is preferred, with recognition that upwardly therefrom a content will be found where crystallization begins. Solids content less than 20% does not change the course of hydrolysis but tends to increase the tendency for putrefaction.

In order to minimize the extent of and tendency for putrefaction to take place during the hydrolysis, we maintain the substrate at a temperature in the range from 46° to 50° C. Putrefaction introduces off-color, bad odor and undesirable taste, and this is one result to be greatly minimized. The mesophilic bacteria which are largely responsible for putrefaction in enzymatic hydrolyses are capable of acting readily at 40° C., the temperature commonly employed for proteolytic enzymolysis of the prior art, while the activity of such bacteria is greatly reduced at 46° to 50° C. The activity of some enzymes, and in particular the proteases, and the peptidases from the yeast, is not impaired in such temperature range.

Additionally, as will appear below, our plasmolysing agent is such that its remainder in the substrate functions to minimize putrefaction.

As the protein we may use any protein of animal or vegetable origin, and even the protein of yeast when the associated natural enzyme content has been rendered ineffective. However, we prefer to use the less expensive commercial proteinaceous materials, and in particular those which contain desirable amino acids to supplement those to be provided by the proteins of the yeast. Suitable proteinaceous materials, are casein, lactalbumin, animal body protein, soya glycinin, wheat gluten, corn gluten, and many others.

We prefer to use commercial proteins and commercial or specially prepared concentrates of those proteolytic enzymes which are effective proteases. We prefer to subject the protein to an initial and partial hydrolysis by the proteases before adding the autolysable yeast substance. Thus, the proteins which may be originally insoluble upon initiation of hydrolysis, become solubilized in whole or in part both before and after introduction to the proteins and peptidases of the yeast. We use those proteolytic enzymes commonly referred to as proteases, which are readily available, and which alone do not carry the hydrolysis to the desired final extent. Suitable proteases for this purpose are trypsin, papain, ficin, erepsin, bromelin, and others.

The pH of the active mass is maintained and adjusted during the entire hydrolysis at a suitable value. Near-neutral conditions, as for example, from pH 5 to pH 7.5 are suitable for any and all of the above-mentioned proteases useful in the present invention, and also suitable for the peptidases of yeast. However, the proteases vary in their activity according to pH so that for the most efficient use of one particular protease, a particular pH may be maintained. Thus, for example, when trypsin is used a pH of 7.5 is desirable. For papain a pH of 6.5 is most effective. For ficin a pH of 6.0 is preferred for the best results. The course of the hydrolysis produces some amino acid, thus changing the pH of the active mass. From time to time the pH may be tested and adjusted for the best results. Where a high concentration of solids is being maintained, and the low water content is an objective, the adjustment is preferably made by the use of a concentrated solution of alkali, such as a 40% by weight solution of caustic soda. However, as well-known in the art, other agents, or buffer compounds may be employed to adjust and maintain a desired pH value. It is pointed out that we prefer not to use a buffer compound, because these act usually by reason of a concentration of a compound which may be undesirable in some uses of the final product. Where caustic soda is used, the compounds of the alkali base thereby introduced are physiologically harmless.

Commercial yeasts vary specifically. There is brewer's yeast and also baker's yeast. For our process, brewer's yeast will function, but in its common form is undesirable as it introduces a noticeable hop-like flavor. Therefore, we prefer to use S. cerevisiae in the form of commercial baker's yeast, since this imparts an acceptable taste and flavor to the product to meet the primary objectives.

Commercial baker's yeast is available in dry active form and in moist compressed active form, the latter containing about 70% moisture. On a dry basis it contains about 45% to 52% protein. In practice, the moist compressed yeast is used, and part of the water for the final reaction mass is derived from use of moist compressed yeast as an ingredient.

The yeast cells for our invention contain both protein and active peptidases, but the latter are locked up in the yeast cell walls in such a manner as to render them dormant with respect to the protein contained in the yeast cell. It is well known that certain agents, even at low concentration, such as toluene, ethyl alcohol, ethyl acetate, ethyl ether, acetone, quaternary ammonium compounds, and numerous surface active agents, are effective to plasmolyse the yeast cell, that is, to dissolve, alter, or disperse the protoplasm of the cell wall in such a manner as to release the enzyme content as active agents. When these released enzymes, after plasmolysis, are allowed to remain with the protein of the cell wall, they act upon the yeast protein hydrolytically, in a process known as autolysis. It is an important feature of the present invention that the activity of the plasmolysed yeast exerts itself in an active mass containing a protease as the other enzyme, and other proteinaceous content or its hydrolytic derivatives, either at the beginning of a hydrolysis by said protease, or in a mass already partially hydrolysed.

We may plasmolyse the yeast apart from the substrate of the other protein and the protease, as by compounding the yeast and a plasmolysing agent therefor in a manner so that it will autolyse. In such case, that kind of autolysis is avoided by adding the plasmolysed yeast to the substrate of the other protein and the protease prior to any substantial degree of progress in the autolysis. Preferably, we effect the plasmolysis in the substrate of the other protein and the protease, by combining the yeast and the plasmolysing agent in the active mass.

In our process, where we aim to produce a relatively clean, bland and palatable protein hydrolysate for medicinal dietary purposes, we prefer to use plasmolysing agents which are volatile, such as volatile fugitive organic liquids of the kind tending to leave little or no residual taste when the dry solids are recovered. Suitable ones are ethyl ether, acetone, ethyl alcohol, and ethyl acetate. We prefer to use an ethyl alcohol denatured with 4% by volume of ethyl ether, hereinafter referred to as "alcohol #32." These volatile plasmolysing liquids may be used in small quantity in the active mass, and they may be entirely or only partly dissolved therein. In the case of ethyl ether, much of that added to the substrate at 46° to 50° C. may boil away, but a sufficient residue dissolves to function for plasmolysis. The presence of an effective plasmolysing quantity is not sufficient to render the protease inactive, and therefore, the progress of hydrolysis by the protease is not halted or materially lessened by adding the volatile plasmolysing agent to a fluid mass ready for hydrolysis or being hydrolysed. Amounts greater than the plasmolysing minimum may be and are preferably used.

In carrying out the invention, we may prepare the active mass initially from all the ingredients therefor, for example by using the predominant proteinaceous material, a protease therefor, the water, the plasmolysing agent, and the yeast, and maintaining this mixture at the temperature of 46° to 50° C. at a proper adjusted pH value. In doing this, the protein may be present initially as a solid, requiring that the mixture be agitated to maintain homogeneous conditions. However, we prefer to allow the predominant protein, which may be initially insoluble, to be acted upon preliminarily by the protease, to bring substantially all of the protein into solution as hydrolytic or peptonized products, such as peptones, peptides, polypeptides and the like. Then the yeast and the plasmolysing agent if it is not already present, are added and the hydrolysis allowed to continue with control of pH and with regulation of temperature in the range required.

The peptidases of the yeast must have a sufficient time to act for increasing the content of amino acids. We have found that about 12 hours for such action is required. Therefore, the plasmolysis of the yeast should take place at least at a time predetermined by the time for ending the hydrolysis. Where the hydrolysis is to run for 24 or 48 hours, the yeast addition should take place respectively at least in 12 or 36 hours after the beginning of the hydrolysis. Practically, we prefer to add the yeast and the plasmolysing agent much earlier, for example, at 4 to 6 hours from the beginning, in part to secure the effect of the plasmolysing agent in inhibiting putrefaction. In like manner the plasmolysing agent may be added initially, and the yeast later. When the plasmolysing agent is added considerably in advance of the yeast, some of it may be lost by evaporation to an extent that the remainder is insufficient to plasmolyse the yeast. Hence, it is to be understood that at the time for plasmolysis, additional volatile plasmolysing agent may be required for that function. The conditions of exposure to the atmosphere may induce loss of plasmolysing agent, and consideration of this factor is in order.

After the hydrolysis is finished, there is residual active enzyme and there is grave danger of putrefaction. Hence, such activity is arrested. This is preferably done by heat. The enzymes are readily inactivated at temperatures around 88° C. (191° F.) and higher. The liquid is, therefore, heated at least to this temperature, not only to arrest action, but to insure that in use of the product, active enzyme is not supplied. Then, with precautions further to prevent contamination by organisms, the material is dehydrated, as by spray drying or vacuum evaporation.

In the following description and explanation, the quantitative measure of results achieved is in terms of conversion of original protein nitrogen to amino-acid nitrogen. In use of protein, such as casein, and in use of yeast, there are supplied numerous compounds registering a nitrogen content. Initially, none of this is determinable as amino-nitrogen by the method of Van Slyke. But after hydrolysis, a substantial portion of the total nitrogen content is determinable as amino-nitrogen. The portion of original total nitrogen which is converted to amino-nitrogen is reported herein as "% conversion," for the purpose of measuring the effectiveness of the peptidases of the yeast in the substrates described.

The activity of peptidases of yeast, compared to peptidases of animal origin, commonly referred to as erepsin, when in combination with protease enzymes, such as trypsin, papain and ficin, and when in substrates of high concentration, is evidenced by the following tests. By making a 25% slurry of casein in water, with trypsin, at 46° to 50° C., the digestion was allowed to proceed for 3 hours. Then in a like instance, 1.5 parts of animal erepsin was added based on the casein present. In a similar case, after 3 hours of digestion, 1 part (dry basis) of plasmolysed yeast to 3 parts of casein was added.

These three digestions, as in Table I, were then carried on for a total of 48 hours. At the end of 24 hours and at the end of 48 hours the conversion to amino acid was determined to be as follows:

TABLE I

|  | Percent conversion | |
| --- | --- | --- |
|  | 24 Hrs. | 48 Hrs. |
| Casein+Trypsin | 30.0 | 31.2 |
| Casein+Trypsin+erepsin | 31.0 | 34.2 |
| Casein+Trypsin+yeast | 39.2 | 46.2 |

In order to demonstrate the relationship of protease to pH, and to show use of different plasmolysing agents, the following Examples 1, 2 and 3 are given:

TABLE II

| Example | 1 | 2 | 3 |
| --- | --- | --- | --- |
| Casein (gms.) | 100 | 100 | 100 |
| Water 49° C. (gms.) | 300 | 300 | 300 |
| Enzyme (kind) | Trypsin | Papain | Ficin |
| Enzyme (gms.) | 1 | 1 | 1 |
| pH | 7.5 | 6.5 | 6 |

The above compositions were maintained at 49° C. for 4 hours, during which the respective enzymes thereof effected solubilization of the casein. Each of the three compositions was then divided into two parts forming Examples 1—a and 1—b, 2—a and 2—b, and 3—a and 3—b. To each of said halves was added a quantity of 55 grams of compressed baker's yeast (70% moisture), and to said a—divisions was added 6 ml. of alcohol #32, and to said b—divisions was added 10 ml. of ethyl ether. Then each of the six divisions was allowed to hydrolyse for an additional 20 hours at which time the pH (measured at 40° C.) was found to be and was adjusted to be as shown in Table III. Also, the percent conversion in 48 hours was found to be as shown in Table III.

TABLE III

| Example | pH in 24 hrs. | | Per cent Conversion |
| --- | --- | --- | --- |
|  | Found | Adjusted |  |
| Trypsin: |  |  |  |
| Alcohol #32 | 1—a | 6.6 | 7.1 | 49.5 |
| Ethyl Ether | 1—b | 6.6 | 7.1 | 48.3 |
| Papain: |  |  |  |
| Alcohol #32 | 2—a | 6.0 | 6.5 | 45.0 |
| Ethyl Ether | 2—b | 6.0 | 6.5 | 46.0 |
| Ficin: |  |  |  |
| Alcohol #32 | 3—a | 5.7 | 6.0 | 57.2 |
| Ethyl Ether | 3—b | 5.7 | 6.0 | 56.0 |

The foregoing examples establish that of the three enzymes employed on the casein, and at the respective pH values, ficin is the most effective one at 49° C.

In order to show the effect of pH on the hydrolysate carried out with ficin, the following example was conducted:

*Example 4*

| Casein | grams | 100 |
| --- | --- | --- |
| Water | ml | 300 |
| Ficin | grams | 1.0 |
| Alcohol #32 | ml | 16 |
| Moist compressed yeast | grams | 110 |

These ingredients except the alcohol and yeast were incorporated together for hydrolysis conducted at a temperature in the range from 46° to 50° C. in three different substrates, each initiated at a pH shown in Table IV below. After 4 hours the alcohol and yeast were added and the hydrolysis continued at 46° to 50° C., with a consequent conversion of nitrogen as shown. Although the pH of 6 is more suitable for ficin, it appears that a pH from 5 to 6 makes little difference in the result, whereas a pH of 4.5 gives inadequate conversion.

TABLE IV

| Example | pH [1] | Per Cent Conversion, 48 Hrs. |
| --- | --- | --- |
| 4—a | [2] 4.5 | 38.3 |
| 4—b | [3] 5.0 | 49.7 |
| 4—c | [3] 6.0 | 52.1 |

[1] Measured at 40° C.
[2] No alkali added in adjustment.
[3] Alkali added in 24 hours to maintain.

The protease for the predominant protein is effective when used at 1 part or less by weight per 100 parts of predominant proteinaceous material, as shown by the following examples:

TABLE V

| Example | 5—a | 5—b | 5—c | 6—a | 6—b | 7—b | 7—c |
| --- | --- | --- | --- | --- | --- | --- | --- |
| Casein (gms.) | 100 | 100 | 100 | 100 | 100 | 100 | 100 |
| Water (ml.) | 300 | 300 | 300 | 300 | 300 | 400 | 400 |
| Ficin (per cent of Casein) | 1.0 | .75 | 0.50 | 1.0 | .75 | .75 | .50 |
| Plasmo. (kind) [1] | Alc#32 | Alc#32 | Alc#32 | Acetone | Acetone | Acetone |  |
| Plasmo. (ml.) | 16 | 16 | 16 | 16 | 16 | 16 | 16 |
| Moist Yeast (gms.) [1] | 110 | 110 | 110 | 110 | 110 | 110 | 110 |
| pH initial | 6 | 6 | 6 | 6 | 6 | 6 | 6 |
| Time (hrs.) | 48 | 48 | 48 | 48 | 48 | 48 | 48 |
| Conversion (per cent) | 52.1 | 52.1 | 48.8 | 47.5 | 48.4 | 53.9 | 52.4 |

[1] Added after 4 hours' progress.
In the above the temperature was 46°–50° C. In all but Example 7—b and 7—c, the pH was adjusted at 24 hours to pH of 6. Examples 7—b and 7—c ended at pH of 5.55.

TABLE VI

| Example | 8—a | 8—b | 9—a | 9—b | 10—a | 10—b | 11—a | 11—b |
| --- | --- | --- | --- | --- | --- | --- | --- | --- |
| Casein (gms.) | 100 | 100 | 100 | 100 | 100 | 100 | 100 | 100 |
| Water (ml.) | 400 | 300 | 400 | 300 | 400 | 300 | 400 | 300 |
| Ficin (gms.) | 1 | 1 | 1 | 1 | .75 | .75 | .5 | .5 |
| Alcohol #32 (gms.) | [1] 12 | 16 | 12 | 16 | 12 | 16 | 12 | 16 |
| Moist Yeast (gms.) | [1] 110 | 110 | 110 | 110 | 110 | 110 | 110 | 110 |
| pH | 6 | 6 | 6 | 6 | 6 | 6 | 6 | 6 |
| Time (hrs.) | 48 | 48 | 48 | 48 | 48 | 48 | 48 | 48 |
| Conversion (percent) | 60.0 | 53.2 | 53.6 | 48.0 | 53.9 | 48.4 | 52.4 | 48.8 |

[1] Added after 4 hours' progress.

The conversion is greater in each instance at the lower concentration of casein, namely 100 parts of dry casein, 477 parts of water, and 33 parts of dry yeast. This is roughly a solids content of 21.8% by weight. The ratio of casein to yeast (dry basis) in the above is roughly 3 to 1, corresponding roughly to a solids content of which 75% is derived from casein and 25% is derived from yeast. The (b) cases have a solids content roughly of 26%. In the higher concentrations, some crystallization took place. At the lower concentrations all the hydrolysate was soluble.

The ratio of yeast solids to total solids (derived from casein and yeast) has been studied in experiments as above, using ficin, and pH of 6. The results are shown in Table VII below.

TABLE VII

| Casein Solids | Yeast Solids | Ratio: Yeast Solids, Total Solids | % Conversion |
|---|---|---|---|
| 5.7 | 1 | 15 | 40.1 |
| 4. | 1 | 20 | 44.6 |
| 3. | 1 | 25 | 47.8 |
| 2.3 | 1 | 30 | 50.4 |

We may use a ratio of 1 part of yeast solids to 2 to 4 parts of the other proteinaceous material, but prefer 3 parts in the case of casein.

The invention as to process gives a high conversion to amino-nitrogen under conditions minimizing dark color, bad odor and undesirable taste. By the use of yeast, the vitamin content of the yeast is preserved and made available. The baker's yeast imparts a distinctive and pleasant taste to the product. Chemically, the amino-acids available in the yeast are all valuable and supplement the amino acids supplied by the other proteinaceous material.

Because yeast is less in protein content than other commercial proteins, it is preferred to use higher-content proteinaceous materials in amount greater than the amount of yeast used, thus to maintain a suitably high nitrogen content for the final product.

Therefore, the invention may be carried out at 46° to 50° C. with various ratios of yeast to the other proteinaceous substance. Commercial casein assays about 80% to 90% protein. From 2 to 4 parts of proteinaceous material and about 1 part of yeast, both dry basis, are employed for the process. These are used in a substrate which we prefer to have at least 20% solids content. A preferred formula as to these principal materials (excepting plasmolysing agent) is:

| | Parts by Weight | | | | |
|---|---|---|---|---|---|
| Proteinaceous material | 2 to 4 | 2 | 2 | 4 | 4 |
| Yeast (dry) | 1 | 1 | 1 | 1 | 1 |
| Water | 12 to 20 | 12 | 20 | 12 | 20 |
| Per cent solids content | | 20 | 13 | 29.4 | 20 |

That the yeast should be plasmolysed and act for a minimum of about 12 hours before ending the hydrolysis, at from 24 to 48 hours of total hydrolysis, is well established by the following series:

*Example 12—a to 12—g.*—100 grams of casein, 350 ml. of water, 0.75 gram of ficin, 16 ml. alcohol #32, and 110 grams of moist compressed yeast, were employed, at a pH of 6.0, and at 116° to 120° F. The alcohol was added 4 hours after initiation. The yeast was added as indicated in Table VIII, which shows the per cent conversion in the total time of 24 or 48 hours, or both, and the time of adding the yeast, both after initiation and before the end of hydrolysis.

TABLE VIII

| Example No. | Total Time of Hydrolysis | Yeast Added | | Per Cent Conversion |
|---|---|---|---|---|
| | | Hours after initiation | Hours before end | |
| 12—a [1] | 12 | | | 22.1 |
| 12—a | 24 | | | 24.4 |
| 12—a | 48 | | | 28.5 |
| 12—f | 48 | 36 | 12 | 30.3 |
| 12—c | 24 | 12 | 12 | 37.5 |
| 12—b | 24 | 4 | 20 | 40.7 |
| 12—e | 48 | 24 | 24 | 44.5 |
| 12—d | 48 | 18 | 30 | 47.6 |
| 12—e | 48 | 12 | 36 | 52.8 |
| 12—b | 48 | 4 | 44 | 51.8 |
| 12—g [2] | 48 | 4 | 44 | 22.8 |

[1] No yeast added.
[2] No ficin added.

No. 12—b and No. 12—g are comparable except as to ficin, and show that the presence of the ficin increases the conversion by 29%. No. 12—a and No. 12—b at 48 hours are comparable except as to yeast, and show that the presence of the yeast increases the conversion by 23.3%. But 12—f, having both ficin and yeast and the latter for only 12 hours, shows about 11% greater conversion due to the combination of yeast and ficin for 12 hours, in the 48 hour run. Other examples in the above show that the longer the combination works, the higher the per cent conversion.

From the foregoing, both at 24 hours and at 48 hours, it appears that at least 12 hours combined action is required to produce a conversion well above that of plasmolysed yeast alone and that of ficin alone.

The following examples illustrate the invention:

*Example 13*

| | Parts by weight |
|---|---|
| Casein (dry commercial) | 1200 |
| Water | 4200 |
| Ficin | 9 |
| Denatured alcohol #32 | 150 |
| Compressed baker's yeast (70% $H_2O$) | 1320 |

This correspond to 1 part yeast, 3 parts casein, 13 parts water, and gives a solids content of about 24%.

Disperse the ficin in a small amount of the water and add it to the remaining water at about 46° C. Add about one-half of the casein over 15 to 30 minutes and adjust to pH of 6.0 (measured at 40° C.), using caustic soda solution of 40% strength by weight. After about 1 hour adjust the pH to 6 and the temperature between 46° and 50° C.

After about six hours from the beginning of action of ficin on the casein, add the alcohol, and then add the yeast. Maintain at 46° to 50° C. and disperse the yeast thoroughly into the mass. Slow agitation is preferred during the entire procedure.

At the end of 24 hours, the pH will be between 5.5 and 6.0 and is then raised to 6.0. At the end of 48 hours, adjust the pH to 6.3 and heat to well above an enzyme-killing temperature of 180° F., as to 200° F., and hold at 200° F. for ten minutes, to inactivate any residual enzyme content. Let settle for several hours or filter through a 60 to 80 mesh screen, and spray dry or vacuum evaporate the clear liquid. The conversion is about 52%.

Examples 14—a, 14—b, and 14—c

| | Parts by weight |
|---|---|
| Casein | 200 |
| Water | 600 |
| Trypsin | 2 |
| Denatured alcohol #32 | 24 |
| Compressed baker's yeast (70% H₂O) | 220 |

This corresponds to 1 part of yeast, 3 parts of casein, and about 26% solids content.

Add one-half the casein to the water at 120° F., adjust the pH to 7.5 with 40% solution of NaOH, then add the trypsin. Hold at 120° F. for one hour, adjust the pH to 7.5 and add the remainder of the casein. Hold the temperature at about 46° to 50° C. for the whole hydrolysis. After 2 to 6 hours from the addition of the trypsin add the alcohol and the yeast. Adjust the pH to 7.4. After 24 hours from the start, clarify by filtration, adjust the pH to 6.3 with hydrochloric acid, and continue for a total hydrolysis time of 48 hours. Vacuum evaporate to obtain the solids. The conversion is 48.5%.

*Example 14—b.*—When this formula is carried out with ficin at pH of 6 substituted for the trypsin, the conversion is 51 to 53% and a mass of crystals is obtained.

*Example 14—c.*—By increasing the water of Example 14—b from 600 to 700 parts, the crystallization is avoided. This reduces the solids content from about 26% to 24%.

Example 15

In Example 14—a change the casein to lactalbumin. The conversion is 46.1%.

Example 16

Use hog-tissue protein for the lactalbumin of Example 15, and the conversion is 40.4%.

Example 17

| | Parts by weight |
|---|---|
| Casein | 50 |
| Water | 150 |
| Papain | .5 |
| Denatured alcohol #32 | 7 |
| Compressed baker's yeast (70% H₂O) | 55 |

This corresponds to about 22% solids content. The yeast and alcohol are added after 3 hours, and the hydrolysis carried on for 48 hours at a pH of about 6.5. At the end the product is filtered and spray dried. The conversion is about 46.7%.

Example 18

Similar to Example 14—a but using acetone in place of the alcohol, and adding the yeast after 4 hours.

The conversions are:

| | Per cent |
|---|---|
| In 24 hours | 40.0 |
| In 48 hours | 49.3 |

Example 19

| | Parts by weight |
|---|---|
| Casein | 200 |
| Water | 600 |
| Trypsin | 2 |
| Acetone | 24 |
| Compressed baker's yeast (70% H₂O) | 220 |

All the ingredients are used at once to make a reaction mass at 46° to 50° C. The pH is adjusted at 7.5.

The conversions are:

| | Per cent |
|---|---|
| In 24 hours | 36.5 |
| In 48 hours | 44.1 |

The product

As produced by a process according to Example 13, the spray-dried product has a typical analysis as follows:

Typical analysis

| | | |
|---|---|---|
| Moisture | per cent | 3.0 |
| Protein (nitrogen × 6.38) | do | 73.4 |
| Total nitrogen | do | 11.5 |
| Amino nitrogen (Van Slyke) | do | 5.7 |
| Amino portion of total nitrogen | do | 50.0 |
| Ether extract (fat) | do | 0.5 |
| Ash | do | 6.1 |
| Carbohydrates (by difference) | do | 17.0 |
| pH (2% solution at 25° C.) | do | 5.8 |
| Color | | Light cream |
| Odor | | Very faint |
| Taste | | bland |
| Solubility (10% solution) | per cent | 98.0 |

The vitamin and amino-acid assay is:

| Acids | 100% Protein Basis N=16% | Vitamins | Micrograms per gram |
|---|---|---|---|
| Arginine | 4.0 | Vitamin B¹ | 2.1 |
| Histidine | 2.6 | | |
| Lysine | 6.7 | Riboflavin | 13.1 |
| Tryosine | 6.0 | | |
| Tryptophane | 1.7 | Niacin | 115.0 |
| Phenylalanin | 5.0 | | |
| Cystine | 0.4 | Pantothenic Acid | 37.8 |
| Methionine | 3.3 | | |
| Threonine | 4.0 | Choline (As Choline Chloride) | 2130.0 |
| Leucine | 12.0 | | |
| Isoleucine | 6.0 | | |
| Valine | 6.6 | | |

The new product as obtained from a spray-drying process and made in accordance with Example 13 has an average bacteriological count which is very low. No yeasts or molds have been found, and the count of bacteria runs on the average at about 250 per gram. This is considerably less than the normal bacterial count of certified milk. The product may be treated with ethylene oxide by the process of Patent Re. 22,284 of Griffith and Hall in order to reduce its bacterial count and even to render the same free from molds, yeasts and bacteria.

The invention may be carried out with numerous deviations from the specific illustrations, and such changes are contemplated within the scope of the appended claims. The invention involves both process and the product thereof.

We claim:

1. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, continuing the hydrolysis at said pH and at said temperature for a total time in the range from 24 to 48 hours, and thereafter rendering the residual enzyme content inactive.

2. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid agent for the yeast for liberating in said mass the peptidases and other enzymes of the yeast, continuing the hydrolysis at said pH and at said temperature for a total time in the range from 24 to 48 hours, thereafter rendering the residual enzyme content inactive, and dehydrating the resulting hydrolysate to its content of dry solids.

3. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, the amounts by weight of water, said amino-acid compounds and said yeast being such that the final mass has a solids content of at least about 20 parts per 100 parts by weight, continuing the hydrolysis at said pH and at said temperature for a total time in the range from 24 to 48 hours, and thereafter rendering the residual enzyme content inactive.

4. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, the amounts by weight of water, said amino-acid compounds and said yeast being such that the final mass has a solids content of at least about 20 parts per 100 parts by weight, continuing the hydrolysis at said pH and at said temperature for a total time in the range from 24 to 48 hours, thereafter rendering the residual enzyme content inactive, and dehydrating the resulting hydrolysate to its content of dry solids.

5. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used by weight on a dry basis 1 part of said yeast to 2 to 4 parts of said proteinaceous material, continuing the hydrolysis at said pH and at said temperature for a total time in the range from 24 to 48 hours, and thereafter rendering the residual enzyme content inactive.

6. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used by weight on a dry basis 1 part of active yeast to 2 to 4 parts of said proteinaceous material, continuing the hydrolysis at said pH and at said temperature for a total time in the range from 24 to 48 hours, thereafter rendering the residual enzyme content inactive, and dehydrating the resulting hydrolysate to its content of dry solids.

7. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used for the final mass by weight 1 part of active yeast on a dry basis, 2 to 4 parts of said proteinaceous material on a dry basis, and a quantity of water to effect a solids content of at least 20% by weight, continuing the hydrolysis at said pH and at said temperature for a total time in the range from 24 to 48 hours, and thereafter rendering the residual enzyme content inactive.

8. The method which consists of forming an aqueous hydrolysable reaction mass consisting substantially of hydrolysable amino-acid compounds of protein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used for the final mass by weight 1 part of active yeast on a dry basis, 2 to 4 parts of said proteinaceous material on a dry basis, and a quantity of water to effect a solids content of at least 20% by weight, continuing the hydrolysis at said pH and at said temperature for a total time in the range from 24 to 48 hours, thereafter rendering the residual enzyme content inactive, and dehydrating the resulting hydrolysate to its content of dry solids.

9. The method which consists of forming an aqueous hydrolysable reaction mass consisting substantially of hydrolysable amino-acid compounds of casein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, continuing the hydrolysis at said pH and at said temperature for a total time in the range from 24 to 48 hours, thereafter rendering the residual enzyme content inactive, and dehydrating the resulting hydrolysate to its content of dry solids.

10. The method which consists of forming an aqueous hydrolysable reaction mass consisting substantially of hydrolysable amino-acid compounds of casein origin, water, and ficin at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, continuing the hydrolysis at said pH and at said temperature for a total time in the range from 24 to 48 hours, thereafter rendering the residual enzyme content inactive, and dehydrating the resulting hydrolysate to its content of dry solids.

11. The method which consists of forming an aqueous hydrolysable reaction mass consisting substantially of hydrolysable amino-acid compounds of casein origin, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, the amounts by weight of water, said amino-acid compounds and said yeast being such that the final mass has a solids content of at least 20 parts per 100 parts by weight, continuing the hydrolysis at said pH and at said temperature for a total time in the range from 24 to 48 hours, thereafter rendering the residual enzyme content inactive, and dehydrating the resulting hydrolysate to its content of dry solids.

12. The method which consists of forming an aqueous hydrolysable reaction mass consisting substantially of hydrolysable amino-acid compounds of casein origin, water, and ficin at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, the amounts by weight of water, said amino-acid compounds and yeast being such that the final mass has a solids content of at least 20 parts per 100 parts by weight, continuing the hydrolysis at said pH and at said temperature for a total time in the range from 24 to 48 hours, thereafter rendering the residual enzyme content inactive, and dehydrating the resulting hydrolysate to its content of dry solids.

13. The method which consists of forming an aqueous hydrolysable reaction mass consisting substantially of casein, water, and a protease at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used by weight on a dry basis about 1 part of active yeast to about 3 parts of said casein, continuing the hydrolysis at said pH and at said temperature for a total time in the range from 24 to 48 hours, thereafter rendering the residual enzyme content inactive, and dehydrating the resulting hydrolysate to its content of dry solids.

14. The method which consists of forming an aqueous hydrolysable reaction mass consisting substantially of casein, water, and ficin at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used by weight on a dry basis about 1 part of active yeast to about 3 parts of said casein, continuing the hydrolysis at said pH and at said temperature for a total time in the range from 24 to 48 hours, thereafter rendering the residual enzyme content inactive, and dehydrating the resulting hydrolysate to its content of dry solids.

15. The method which consists of forming an aqueous hydrolysable reaction mass consisting substantially of casein, water, and ficin at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used for the final mass by weight about 1 part of active yeast on a dry basis, about 3 parts of said casein on a dry basis, and a quantity of water to effect a solids content of at least 20% by weight, continuing the hydrolysis at said pH and at said temperature for a total time in the range from 24 to 48 hours, thereafter rendering the residual enzyme content inactive, and dehydrating the resulting hydrolysate to its content of dry solids.

16. The method which consists of forming an aqueous hydrolysable reaction mass consisting substantially of casein, water, and ficin at a pH in the range from 5 to 7.5 and at a temperature in the range from 46° to 50° C., incorporating into said mass at least 12 hours prior to the hereinafter-mentioned end of the hydrolysis a quantity of hydrolysable protein consisting substantially of active yeast *S. cerevisiae* and a quantity of volatile plasmolysing liquid for the yeast for liberating in said mass the peptidases and other enzymes of the yeast, there being used for the final mass by weight about 1 part of active yeast on a dry basis, about 3 parts of said casein on a dry basis, and a quantity of water to effect a solids content of at least 20% by weight, continuing the hydrolysis at said pH and at said temperature for a total time in the range from 24 to 48 hours, thereafter rendering the residual enzyme content inactive, and dehydrating the resulting hydrolysate to its content of dry solids.

17. The method which consists of forming an aqueous hydrolysable reaction mass initially consisting substantially of casein, water, and ficin in quantity of about 1 part ficin to 100 parts of casein, at a pH of about 6 and at a temperature in the range from 46° to 50° C., incorporating into said mass at least 12 hours prior to the hereinafter-mentioned end of the hydrolysis a quantity of hydrolysable protein consisting substantially of active yeast S. cerevisiae and a quantity of volatile plasmolysing liquid for the yeast for liberating in said mass peptidases and other enzymes of the yeast, there being used for the final mass by weight about 1 part of active yeast on a dry basis to about 3 parts of said casein on a dry basis and a quantity of water to effect a solids content in the vicinity of 20% to 25% by weight such as to effect solution of all the products of hydrolysis, continuing the hydrolysis at said pH and at said temperature for a total time in the range from 24 to 48 hours, thereafter rendering the residual enzyme content inactive, and dehydrating the resulting hydrolysate solution to its content of dry solids.

18. The method which consists of forming an aqueous hydrolysable reaction mass at a pH of about 6 and at a temperature in the range from 46° to 50° C., and initially consisting substantially of water, 100 parts of casein, and about 1 part of ficin, and containing at a time at least 12 hours before the end of the hydrolysis about 33 parts (dry basis) of hydrolysable protein consisting substantially of active yeast S. cerevisiae, and a quantity of volatile plasmolysing liquid for the yeast for liberating in said mass petidases and other enzymes of the yeast, there being used for the final mass a quantity of water to effect a solids content in the vicinity of 20% to 25% by weight such as to effect solution of all the products of hydrolysis, continuing the hydrolysis at said pH and at said temperature for a total time in the range from 24 to 48 hours, thereafter rendering the residual enzyme content inactive, and dehydrating the resulting hydrolysate solution to its content of dry solids.

19. The method which consists of incorporating into an aqueous reaction mass consisting substantially of hydrolysable amino-acid compounds of protein origin, water, and a protease therefor, at 46° to 50° C., plasmolysed active yeast S. cerevisiae which is substantially unautolyzed, continuing the hydrolysis of the resulting mass by the resulting mixed enzymes for at least 12 hours at 46° to 50° C., and thereafter rendering the residual enzyme content inactive.

LLOYD A. HALL.
LOUIS SAIR.

REFERENCES CITED

The following references are of record in the file of this patent:

UNITED STATES PATENTS

| Number | Name | Date |
|---|---|---|
| 2,217,264 | Weizmann | Oct. 8, 1940 |

OTHER REFERENCES

Industrial Microbiology by Prescott and Dunn, 1st ed. (1940), pp. 25 and 307.

Bacteriology by Tanner, 3rd ed. (1938), page 141.